UNITED STATES PATENT OFFICE.

PAUL RALPH HERSHMAN, OF CHICAGO, ILLINOIS, ASSIGNOR TO ARMOUR FERTILIZER WORKS, OF CHICAGO, ILLINOIS, A CORPORATION OF NEW JERSEY.

PRODUCTION OF ALUMINATE FROM ALUNITE.

1,240,570.     Specification of Letters Patent.     Patented Sept. 18, 1917.

No Drawing.     Application filed October 21, 1916. Serial No. 126,997.

*To all whom it may concern:*

Be it known that I, PAUL R. HERSHMAN, a subject of the Empire of Austro-Hungary, residing at Chicago, county of Cook, State of Illinois, have invented certain new and useful Improvements in the Production of Aluminate from Alunite; and I do hereby declare the following to be a full, clear, and exact description of the invention, such as will enable others skilled in the art to which it appertains to make and use the same.

In Letters Patent of the United States No. 1,191,104, granted under date of July 11, 1916, I have described a method of obtaining aluminate from alunite. In the description forming a part of the specification of said patent, it is stated as a preferred method of carrying the invention into practice, that an amount of 15 parts by weight of calcium oxid may be employed to 100 parts by weight of alunite. Thus, a compound is obtained containing one molecule of aluminum oxid to one molecule of potassium oxid, corresponding to the formula $Al_2O_3.K_2O$.

I have now discovered that higher proportions of water-soluble alumina can be obtained, by varying the proportions of the mixture and by varying the conditions of the operation. Thus, by employing thirty parts by weight of calcium oxid in admixture with 100 parts by weight of alunite and heating the mass to 1000°C. with the assistance of steam, about 40% of the total alumina contained in the alunite may be made soluble and the potassium aluminate obtained will correspond practically to the formula $2Al_2O_3.K_2O$. This compound seems to have been heretofore unknown.

In practising the invention, 100 parts by weight of finely pulverized crude basic alunite (such as is found in large deposits in Utah) are mixed with thirty parts by weight of calcium oxid, and heated in a muffle furnace at a temperature of about 1000°C. until the reaction is completed, the heating being carried on in the presence of steam maintained at the same temperature. Thereafter, the potassium aluminate formed is dissolved out from the resulting mass, and the residue consists of alkali-soluble alumina together with whatever impurities may be present therein, but is substantially free from potassium compounds. The alumina may then be extracted in any suitable manner as indicated, for instance, in the patent referred to.

The main advantage of the method herein described, is that it permits most of the potassium contained in the alunite to be extracted in a form combined with a comparatively large amount of the alumina in water-soluble form as potassium aluminate, from which pure potassium carbonate and alumina can be obtained.

Having thus described my invention what I claim is:

1. The method of producing potassium aluminate, which comprises treating a mixture of substantially 100 parts by weight of alunite to thirty parts by weight of calcium oxid, at a temperature of about 1000°C. in the presence of steam, and subsequently dissolving out the potassium aluminate from the resulting mass; substantially as described.

2. As a new product of manufacture, potassium aluminate corresponding substantially to the formula $2Al_2O_3.K_2O$.

In testimony whereof I affix my signature.

PAUL RALPH HERSHMAN.